(12) United States Patent
Munding et al.

(10) Patent No.: US 11,173,944 B2
(45) Date of Patent: Nov. 16, 2021

(54) MOTOR-ADJUSTABLE STEERING COLUMN FOR A MOTOR VEHICLE

(71) Applicants: thyssenkrupp Presta AG, Eschen (LI); thyssenkrupp AG, Essen (DE)

(72) Inventors: Christoph Munding, Eschen (LI); Hieronymus Schnitzer, Gamprin (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/768,128

(22) PCT Filed: Dec. 13, 2018

(86) PCT No.: PCT/EP2018/084785
§ 371 (c)(1),
(2) Date: May 29, 2020

(87) PCT Pub. No.: WO2019/121330
PCT Pub. Date: Jun. 27, 2019

(65) Prior Publication Data
US 2020/0317251 A1 Oct. 8, 2020

(30) Foreign Application Priority Data
Dec. 20, 2017 (DE) ...................... 10 2017 223 469.5

(51) Int. Cl.
*B62D 1/181* (2006.01)
*B62D 1/185* (2006.01)
*B62D 1/19* (2006.01)

(52) U.S. Cl.
CPC ............ *B62D 1/181* (2013.01); *B62D 1/185* (2013.01); *B62D 1/192* (2013.01); *B62D 1/195* (2013.01)

(58) Field of Classification Search
CPC ........ B62D 1/181; B62D 1/185; B62D 1/192; B62D 1/195
See application file for complete search history.

(56) References Cited

U.S. PATENT DOCUMENTS 2,769,351 A 11/1956 Serfling
4,602,520 A * 7/1986 Nishikawa ............. B62D 1/181
280/775
(Continued)

FOREIGN PATENT DOCUMENTS

DE 102 59 596 B 5/2004
DE 10 2011 083 190 A 3/2013
(Continued)

OTHER PUBLICATIONS

English Translation of International Search Report issued in PCT/EP2018/084785, dated Apr. 4, 2019.

*Primary Examiner* — Drew J Brown
(74) *Attorney, Agent, or Firm* — thyssenkrupp North America, LLC

(57) ABSTRACT

A motor-adjustable steering column for a motor vehicle includes an outer casing which is held by a support unit that is attachable to a vehicle body and in which an actuator unit is received so as to be telescopically adjustable in the longitudinal direction. A steering spindle is coaxially mounted in a casing tube in the actuator unit so as to be rotatable about a longitudinal axis. An adjustment drive is disposed between the outer casing and the actuator unit and has a threaded spindle which is at least in part disposed within the actuator unit and is drivable in a rotating manner by an electric servomotor engaged in a spindle nut. In order for a compact adjustment drive which is accommodated in a protected manner to be provided, the threaded spindle is disposed at a spacing from the longitudinal axis.

14 Claims, 8 Drawing Sheets

(56) References Cited

U.S. PATENT DOCUMENTS

| | | | | |
|---|---|---|---|---|
| 4,716,780 A | * | 1/1988 | Nishikawa | B62D 1/181 280/775 |
| 4,934,737 A | * | 6/1990 | Nakatsuka | B62D 1/181 180/78 |
| 5,178,411 A | * | 1/1993 | Fevre | B62D 1/181 280/775 |
| 5,188,392 A | | 2/1993 | Sugiki | |
| 5,265,906 A | * | 11/1993 | Faulstroh | B62D 1/181 280/775 |
| 5,737,971 A | | 4/1998 | Riefe | |
| 5,911,789 A | * | 6/1999 | Keipert | F16H 25/2006 74/493 |
| 7,293,481 B2 | * | 11/2007 | Li | B62D 1/181 74/492 |
| 7,410,190 B2 | * | 8/2008 | Sawada | B62D 1/19 180/427 |
| 2006/0169524 A1 | | 8/2006 | Born | |
| 2014/0305252 A1 | * | 10/2014 | Mizuno | B62D 1/187 74/493 |
| 2018/0319419 A1 | | 11/2018 | Kreutz | |
| 2020/0172147 A1 | * | 6/2020 | Caverly | B62D 1/181 |
| 2020/0325990 A1 | * | 10/2020 | Wilson-Jones | B62D 1/181 |

FOREIGN PATENT DOCUMENTS

| | | |
|---|---|---|
| DE | 10 2015 224 602 A | 6/2017 |
| DE | 10 2017 207 561 A | 7/2017 |
| WO | 2018202672 A | 11/2018 |

* cited by examiner

MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2018/084785, filed Dec. 13, 2018, which claims priority to German Patent Application No. DE 10 2017 223 469.5, filed Dec. 20, 2017, the entire contents of both of which are incorporated herein by reference.

FIELD

The present disclosure generally relates to a motor-adjustable steering column for a motor vehicle.

BACKGROUND

A steering column for a motor vehicle has a steering shaft with a steering spindle, a steering wheel for introducing steering commands being attached to the end which in the travel direction is the rear end and faces the driver. The steering spindle in the actuator unit is mounted in an inner casing, also referred to for short as the casing tube or the inner casing, so as to be rotatable about the longitudinal axis of said steering spindle. The actuator unit is received in an outer casing, also referred to as the casing unit, swingarm box or guide box, which by way of support unit is held on the vehicle body. The adjustment of the actuator unit in the longitudinal or height direction, respectively, enables an ergonomically comfortable steering wheel position relative to the driver position to be set in the operating position, also referred to as the driving or operator position, in which a manual steering intervention can take place.

An adjustment of the length can be implemented in that the actuator unit is received in the outer casing so as to be telescopically displaceable in the longitudinal direction, this corresponding to the direction of the longitudinal axis, as is described in the prior art, for example in DE 10 2017 207 561 A1 or DE 10 2015 24 602 A1. A linear motorized adjustment drive which is configured as a spindle mechanism with a threaded spindle which is screwed into a spindle nut and which by an electric motor is drivable in a rotating manner relative to the spindle nut is provided herein for carrying out the adjustment movement of the actuator unit relative to the outer casing. The threaded spindle and the spindle nut in the longitudinal direction are supported between the actuator unit and the outer casing such that the actuator unit is retracted or deployed in a telescoping manner relative to the outer casing, depending on the relative direction of rotation.

An adjustment of height can optionally be implemented in that the actuator unit or the outer casing is mounted so as to be pivotable on the support unit and optionally is likewise adjustable by means of an electric adjustment drive.

Motor-adjustable steering columns offer increased driving and operating comfort, in that individual steering wheel positions for different drivers are electronically memorized, for example, and can be recalled and set automatically when required. It is furthermore of particular interest that the steering column in specific operating situations can be adjusted to predefined positions in an automated manner. For example, in autonomous travel no manual steering intervention by the driver is required during travel such that the steering wheel can in principle be moved out of the operating position to a stowage position so as to be able to utilize the vehicle interior space that becomes available on account thereof in an alternative manner.

DE 10 2017 207 561 A1 shows in an exemplary manner an embodiment which is known in many variants and in which the spindle mechanism is attached externally beside the outer casing. This is considered as proven and reliable but requires a relatively large installation space in the motor vehicle, and the threaded spindle lies exposed and externally unprotected.

A possibility for disposing the threaded spindle of the spindle mechanism so as to be coaxial on the longitudinal axis is known from DE 10 2015 224 602 A1. On account thereof, the threaded spindle can indeed be accommodated so as to be protected within the actuator unit in the casing tube. However, an arrangement of this type is implementable only in special construction modes of a steer-by-wire steering installation without a mechanically continuous steering shaft in which the steering spindle terminates in the region of the actuator unit toward the steering wheel and in particular does not run through the steering column in the longitudinal direction, that is to say the steering spindle does not exit toward the front from the outer casing from the end toward the steering gear and facing away from the end toward the steering wheel, where said steering spindle by way of the steering shaft is connected to a steering gear.

The coaxial arrangement of the threaded spindle is not suitable for steering columns which are mechanically coupled to the steering gear.

Thus a need exists for a universally usable motor-adjustable steering column which has a compact adjustment drive which is accommodated so as to be protected.

DETAILED DESCRIPTION

Figure 1:
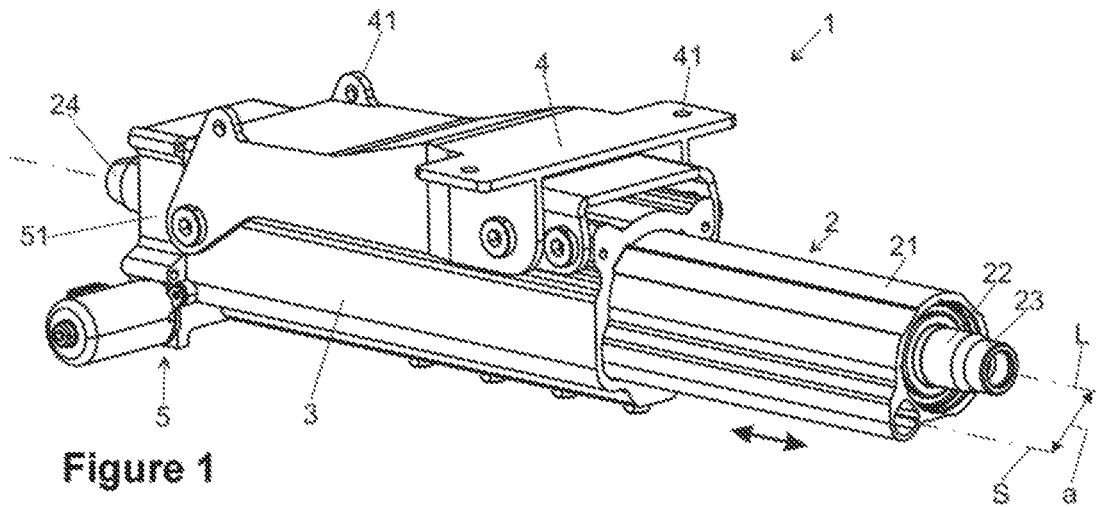
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a motor-adjustable steering column for a motor vehicle, comprising an outer casing which is held by a support unit that is attachable to a vehicle body and in which an actuator unit is received so as to be telescopically adjustable in the longitudinal direction, a steering spindle being coaxially mounted in a casing tube in said actuator unit so as to be rotatable about a longitudinal axis, wherein an adjustment drive is disposed between the outer casing and the actuator unit and has a threaded spindle which is at least in part disposed within the actuator unit and which so as to be drivable in a rotating manner by an electric servomotor engages in a spindle nut.

According to the invention, in a motor-adjustable steering column for a motor vehicle, comprising an outer casing which is held by a support unit that is attachable to a vehicle body and in which an actuator unit is received so as to be telescopically adjustable in the longitudinal direction, a steering spindle being coaxially mounted in a casing tube in said actuator unit so as to be rotatable about a longitudinal axis, wherein an adjustment drive is disposed between the outer casing and the actuator unit and has a threaded spindle which is at least in part disposed within the actuator unit and which so as to be drivable in a rotating manner by an electric servomotor engages in a spindle nut, it is provided that the threaded spindle is disposed at a spacing from the longitudinal axis.

The motorized adjustment drive configured as a spindle mechanism engages on the outer casing and the actuator unit such as is known per se for the functionality of the longitudinal adjustment. Accordingly, the adjustment drive is operatively disposed in the flux of force between the outer casing and the actuator unit. For the longitudinal adjustment, the actuator unit in the direction of the longitudinal axis can be telescopically deployed from the outer casing or be retracted into the latter. On account of the threaded spindle being at least in part disposed within the actuator unit, the threaded spindle is in particular also protected in relation to environmental influences when the actuator unit is deployed rearward to the maximum, thus deployed from the outer casing in the direction toward the driver position, wherein the actuator unit is in part externally exposed.

According to the invention, the spindle axis of the threaded spindle has a radial spacing from the longitudinal axis and thus lies so as to be eccentric in terms of the longitudinal axis. This results in the particular advantage of the invention that the central, coaxial, passage through the steering column remains free for the mechanical routing of the centrically disposed steering spindle or steering shaft, respectively, to the steering gear or to a manual actuator (feedback actuator). On account thereof, a reliably protected spindle mechanism of compact construction can for the first time be implemented in a conventional, mechanically coupled, steering column having a coaxially continuous steering shaft in the longitudinal direction, as well as in an electrically coupled steer-by-wire steering column.

The threaded spindle is preferably enclosed by the outer casing in the region which, depending on the adjustment state, that is to say of the respective longitudinal setting of the steering column, is not situated or only partially situated within the actuator unit, and on account thereof is externally protected also in the maximum deployed state. In other words, the threaded spindle, independently of the adjustment of the steering column, can at least in part, preferably along the entire length thereof, be disposed so as to be protected in the interior of the telescopic assembly formed by the actuator unit and the outer casing. To this end, the outer casing and the casing tube of the actuator unit can preferably be configured as hollow sections which are circumferentially closed and which circumferentially enclose the threaded spindle.

On account of the spindle mechanism engaging internally on the actuator unit and the outer casing, a compact construction mode having smooth external faces without externally projecting supports can be implemented.

The casing tube can be configured as a casting, for example from aluminum, magnesium, or other metal alloys. The manufacturing can take place economically as an extruded profile in which a continuous hollow section having a continuous consistent cross section is generated, the casing tube in the required length being cut therefrom. Alternatively, the casing tube can be made as a formed sheet-metal part.

It can be provided that the threaded spindle is supported in the longitudinal direction on the outer casing, and the spindle nut is attached in a rotationally fixed manner on the actuator unit so as to be supported in the longitudinal direction. The threaded spindle and the spindle nut in terms of the spindle axis can be driven in a mutually relative rotating manner by a drive unit, by means of an electric motor and an optionally intervening gearbox, for example a worm gear, so that the threaded spindle and the spindle nut are moved in a translatory manner toward one another or away from one another in the direction of the spindle axis, depending on the rotating direction, and the actuator unit is correspondingly retracted or deployed relative to the outer casing.

The spindle drive can be designed as a rotary spindle drive in which the drive unit is connected so as to be stationary with the outer casing and for adjustment drives in a rotating manner the threaded spindle in relation to the spindle nut which is connected in a rotationally fixed manner to the actuator unit. The spindle nut can be attached or configured so as to be space-saving and protected within the casing tube of the actuator unit. When the actuator unit is retracted into the outer casing the threaded spindle is screwed into the spindle nut and hereby is immersed in a translatory manner in the actuator unit which in a telescoping manner moves into the outer casing. One advantage of the rotary spindle drive having a spindle nut fastened to the actuator unit lies in that the mass of the actuator unit that is moved when adjusting is not or only slightly increased by the spindle nut, on account of which a high adjustment acceleration can be achieved by way of a relatively minor drive output.

In an alternative construction mode of the spindle drive, which is referred to as an immersion spindle drive, the threaded spindle is fixed in a rotationally fixed manner to the actuator unit, but so as to be stationary in the direction of the spindle axis, or of the longitudinal axis, respectively, on said actuator unit, and the spindle nut which is fixed in the longitudinal direction is drivable in a rotating manner by the drive unit. A translatory movement for adjusting the outer casing and the actuator unit relative to one another can likewise be implemented in this manner.

It is advantageous for the drive unit to be connected to the outer casing. On account thereof, the mass of the actuator unit that is moved when adjusting can be kept low, having the advantages described above. However, it is also conceivable for the drive unit to be fixed to the actuator unit and for the spindle nut to be supported on the outer casing, for example in order to adapt to an available installation space in the motor vehicle.

The threaded spindle is preferably disposed so as to be parallel to the longitudinal axis. The threaded spindle axis, or the spindle axis for short, and the longitudinal axis in this instance run so as to be mutually parallel. On account of the threaded spindle being able to be disposed at a relatively minor radial spacing from the steering spindle which is mounted coaxially in the casing tube of the actuator unit, a space-saving, compact, construction is enabled. Moreover, potential impediments of the spindle mechanism on account of transverse forces or bending stresses can be largely avoided.

One advantageous embodiment of the invention provides that the actuator unit has an opening which receives the steering spindle, and the threaded spindle is disposed in a spindle tunnel which is configured so as to be separate from the opening. The opening can be configured so as to correspond to the cross section of the casing tube of the actuator unit, said cross section being open in the longitudinal direction and the steering spindle being rotatably mounted coaxially therein, as is known in principle from the prior art, wherein the longitudinal axis, that is to say the rotation axis of the steering spindle, coincides with the central opening axis. The opening can have a circular cross-section, or else be designed so as to be polygonal, regular or irregular, for example quadrangular, hexagonal, or octagonal. The spindle tunnel forms a second opening which at a spacing is preferably aligned so as to be parallel to the afore-mentioned opening, or of the longitudinal axis, respectively. The spindle tunnel in terms of the longitudinal axis is configured having a radial spacing in such a manner that the threaded spindle can be received therein in an axially spaced apart manner, preferably an axially parallel manner to the longitudinal axis. The spindle tunnel cross section can likewise be shaped circular, polygonal or multi-angular, wherein the spindle axis can be aligned along a tunnel axis.

The opening and the spindle tunnel can in each case be configured so as to be circumferentially closed. On account of a closed configuration in the shape of the tubular profile, the threaded spindle can be circumferentially completely closed by the spindle tunnel and thus be optimally protected against external influences. The operational reliability in the event of a crash is furthermore increased on account of the separate configuration of the opening and the spindle tunnel in that the steering spindle and/or the threaded spindle can indeed also be deformed by the extremely high stresses arising therein, but the steering spindle and the threaded spindle in terms of their respective functions thereof cannot be mechanically compromised.

The opening and the spindle tunnel can be configured in the casing tube of the actuator unit. On account thereof, the casing tube can form a compact and dimensionally stable component which enables a space-saving, compact, construction of the actuator unit and thus of the entire steering column.

Figure 8:
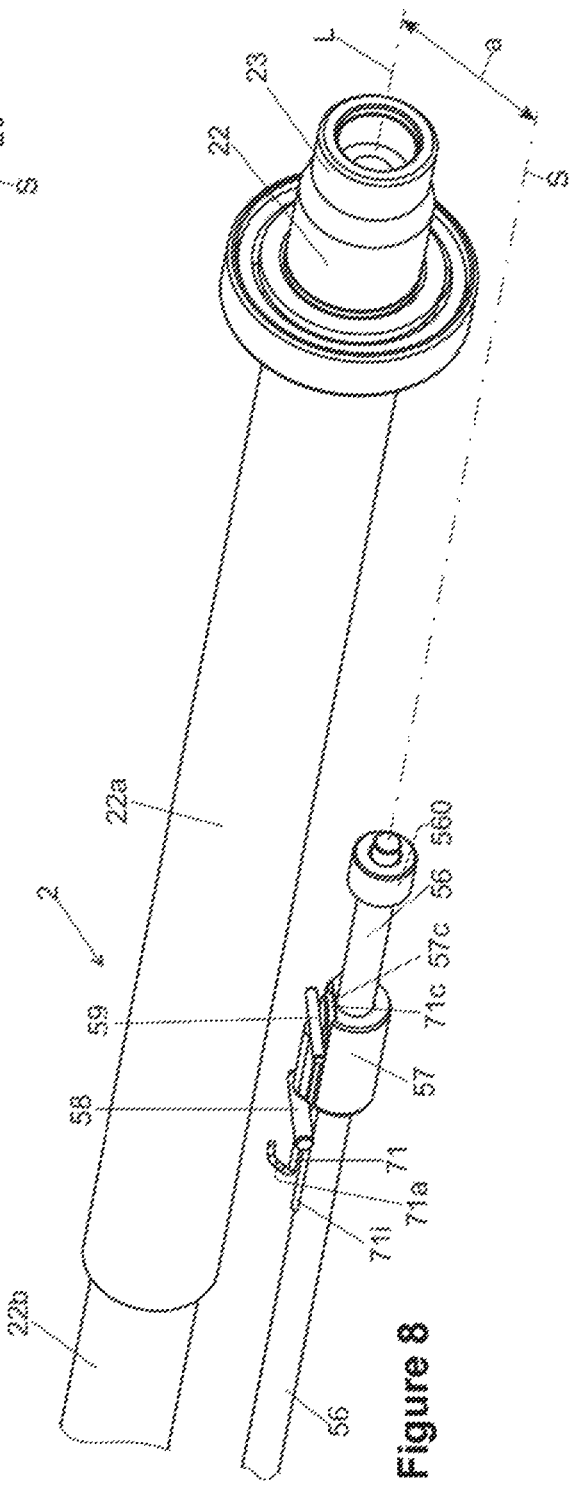
FIG. 8 is an exploded individual view of functional elements of the assembly according to FIG. 7.

It is advantageous for the casing tube to be integrally configured in such a manner that the opening in which the steering spindle is disposed and the spindle tunnel are configured in the integral casing tube. The cross section of the casing tube in this instance can have a basic shape which is substantially that of a FIG. 8, wherein the steering spindle is mounted in the one opening, and the threaded spindle is mounted in the other.

It can be provided that two circular-cylindrical tubes, preferably of dissimilar diameters, are length-wise welded to one another. The tubes are in mutual contact on the external casing faces such that said external casing faces lie on one another in a convex-to-convex manner and a fillet weld can be placed between the tubes in a simple manner.

The one tube forms the spindle tunnel, and the other tube forms the opening for receiving the steering shaft.

The casing tube is particularly preferably configured in one piece as an integral component. An integral casing tube of this type can be configured, for example, as an extruded profile having a profile cross-section which is continuous along the length, for example from aluminum or magnesium alloys. Extruded profiles in manifold cross-sectional shapes can be constructed economically and in a dimensionally stable and cost-effective manner. A further advantage lies in that, depending on the embodiment of the steering column, a portion of the length of the casing tube can be cut from a blank of an extruded profile having a multiple length of the casing tube. On account thereof, the manufacturing of different types of steering columns having actuator units which are of identical cross section but of dissimilar lengths can be performed in a more economical manner. Alternatively, it is likewise conceivable and possible for the casing tube to be configured as a casting, wherein a casting material such as an aluminum or magnesium alloy is preferably used.

Alternatively, the casing tube can be made as a form sheet-metal part, preferably from steel sheet. In order for the spindle tunnel to be closed off in relation to the opening for receiving the steering column such that two mutually separate openings which are in each case circumferentially closed can be formed in the cross section, the circumference of the spindle tunnel can be closed by means of a closure part. For example, a cover as the closure part can be inserted internally conjointly with the formed sheet-metal part and be fixedly connected, for example by welding. On account thereof, a passage which between the spindle tunnel and the opening for receiving the steering shaft in the longitudinal direction is slot-shaped can be closed. The closure part herein can form a bracing by way of which the stiffness of the casing tube is increased.

The spindle nut can be fastened in the spindle tunnel. In the case of the above-mentioned rotary spindle drive the spindle nut is secured on the actuator unit so as to be stationary in the longitudinal direction and so as to be rotationally fixed in terms of rotation about the spindle axis. This fixing to the actuator unit can favorably take place by establishing within the spindle tunnel. In order for rotationally-fixed fixing to be implemented it is advantageous for the spindle nut in terms of a rotation about the spindle axis to engage in a form-fitting manner in the cross section of the spindle tunnel. For example, the spindle nut can have a polygonal or multi-angular cross-section, for example in the shape of a symmetrical or else irregular square, pentagon, hexagon, or polygon, wherein the opening cross section of the spindle tunnel is configured correspondingly thereto, so as to enable inserting in the longitudinal direction for the assembling of the spindle nut. On account thereof, the spindle nut is held in a rotationally fixed manner on the spindle axis without additional fastening or holding elements. The spindle nut within the spindle tunnel can be fixed and supported, for example by suitable fastening means, in the longitudinal direction at the required longitudinal position of the actuator unit.

The thread of the spindle nut preferably extends only along a sub-portion of the length of the spindle tunnel. The sub-portion can be less than 50%, preferably less than 20%, of the length of the spindle tunnel.

The opening in which the spindle nut is received, thus in other words the spindle tunnel, extends at least along 50% of the length of the casing tube, particularly preferably along 80% of the length of the casing tube, and most particularly preferably along the entire length of the casing tube.

The outer casing preferably has a coaxial receptacle opening in which the actuator unit is received in a telescopic manner. The casing tube which has a coaxial opening for the steering spindle and an opening receiving the threaded spindle, for example in the form of a spindle tunnel, herein is received in a guided manner so as to be telescopic in the longitudinal direction within the outer casing. On account thereof, the portion of the threaded spindle which, depending on the adjustment, is not immersed in the actuator unit is externally protected by the outer casing.

The outer casing can have an extruded profile. The extruded profile at the side toward the steering wheel has an open receptacle opening, the open cross-section of the latter receiving the casing tube of the actuator unit in a telescopic manner, preferably in the form-fitting manner in terms of the rotation about the longitudinal axis, on account of which a positive orientation and a high dimensional stiffness can be achieved. The manufacturing by cutting lengths from a long extruded profile blank (semifinished product) has the advantages mentioned above in the context of the casing tube.

At least one linear guide in the manner of a friction bearing or roller bearing is preferably configured between the outer casing and the actuator unit. A linear guide on the inside in the outer casing and on the outside on the casing tube has mutually corresponding guiding faces which are elongated in the longitudinal direction and are radially mutually opposite. In an adjustment, the guiding faces are moved relative to one another in the longitudinal direction. The guiding faces can be configured as friction faces of a linear friction bearing which without play can slide directly on one another, or between which an additional friction member or a friction layer which with little play lies on both friction faces of a friction guide can be inserted. The friction faces can be designed so as to be friction-reducing, for example by applying friction-reducing means, and alternatively or additionally a friction member, for example in the form of a coating or a friction sleeve from a positively sliding-capable material such as, for example, polytetrafluoroethylene (PTFE) or the like, can be inserted between the outer casing and the casing tube. Alternatively, the linear guide can be configured as a linear roller bearing guide, wherein roller members, for example rollers, needle rollers, or balls, which can role in the longitudinal direction are inserted between the guiding faces which are configured as roller bearing faces. The embodiments of the linear guides mentioned guarantee a smooth-running and telescopic adjustment of the actuator unit relative to the outer casing with little play. The guiding faces can advantageously be molded in extruded profiles such that the manufacturing of the casing tube and/or of the outer casing can take place in an economical manner.

One preferred refinement of the invention can provide that an energy absorbing installation is disposed between the outer casing and the actuator unit. As an effective measure for improving the occupant safety in a vehicle collision, the so-called event of a crash, in which the driver impacts the steering wheel at a high velocity, an energy absorbing installation, also referred to as a crash system, can be coupled between the outer casing and the actuator unit. If, in the event of a crash, a high force which exceeds a predefined limit value is exerted in the longitudinal direction on the steering spindle on account of a body hitting the steering wheel, the actuator unit is pushed forward into the outer casing, wherein the kinetic energy introduced by the relative movement and introduced into the energy absorbing installation is converted into deformation work such that the body hitting the steering wheel is decelerated in a controlled manner and the risk of injury is reduced.

It is advantageous for the energy absorbing installation to have an energy absorbing element which is disposed directly or indirectly between the spindle nut or the threaded spindle and the actuator unit. A deformation portion of the energy absorbing element in the event of a crash, while absorbing kinetic energy, is plastically deformed, for example by bending a flexural lug, tearing apart a tear-off lug, widening a slot, or the like, on account of the relative movement between the outer casing and the actuator unit.

Energy absorbing elements of this and further types, and combinations thereof, are known in principle from the prior art.

The energy absorbing installation in the event of a crash lies in the longitudinal directed flux of force between the spindle mechanism and the outer casing and the casing tube of the actuator unit, such that the energy is introduced into the energy absorbing element by way of the spindle and the spindle nut. On account of the energy absorbing element being disposed directly between the spindle nut and the casing tube of the actuator unit, said energy absorbing element in the case of the above-described rotary spindle drive can advantageously be disposed conjointly with the spindle nut so as to be protected within the actuator unit, for example in the spindle tunnel. On account thereof, the energy absorbing installation is protected in relation to potentially damaging influences, and the functional reliability is increased. Said energy absorbing installation in the case of an immersion spindle drive can be accommodated so as to be likewise protected in the actuator unit, between the threaded spindle, which in this instance is rotationally fixed, and the actuator unit.

It can be provided that a predetermined breaking element is disposed between the spindle nut or the threaded spindle and the actuator unit. When exceeding a defined, high, limit force in the longitudinal direction between the outer casing and the actuator unit, the predetermined breaking element is separated or breaks away, respectively, and then releases the relative movement in order for the energy absorbing element to be deformed. Said predetermined breaking element can be configured as a shear pin, for example. The response behavior of the absorption of energy can be predefined in the defined manner on account of the controlled break-away so that the energy absorbing device is mechanically stressed exclusively in the event of a crash, on account of which the functional reliability is increased.

It can be provided in one advantageous refinement that the spindle nut is formed from a plastics material, for example from polyoxymethylene. The spindle nut can thus be produced in a simple and cost-effective manner. It can alternatively be provided that the spindle nut is formed from a non-ferrous metal such as brass. A combination of a non-ferrous metal and a plastics material is also conceivable and possible.

On account of the eccentric disposal of the spindle mechanism according to the invention, the steering spindle can be coupled to a steering gear or to a feedback actuator. The coaxially disposed steering spindle in a conventional steering column can be routed in the longitudinal direction through the telescopic assembly of the outer casing and the casing tube forward toward the steering gear, or else be used without any mechanical coupling in a steer-by-wire steering in which the steering spindle can be connected to a feedback actuator which can be disposed within the actuator unit or the outer casing, or else outside the outer casing, wherein the steering spindle as in a conventional assembly can be routed through the steering column.

In a steering column of the type mentioned at the outset, the spindle nut, or alternatively the threaded spindle, can have at least one forming element which operatively engages with the energy absorbing element and by way of which the energy absorbing element is plastically deformable.

The spindle mechanism in a relative displacement in the event of a crash is disposed in series with the energy absorbing element in the direction of the flux of force, between the outer casing and the actuator unit, as is known per se with view of the functionality of the absorption of energy. In the event of a crash, the energy absorbing element is moved relative to the forming element which is configured on the spindle mechanism.

It is advantageous for at least one forming element to be configured on the spindle nut, for example between the spindle nut and the actuator unit, the latter when adjusting in the normal operation being entrained in the longitudinal direction by the spindle nut and only being moved relative to the spindle nut in the event of a crash. The forming element according to the invention herein acts on the energy absorbing element which is entrained by the actuator unit and moves relative to the spindle nut such that said forming element at least over part of the longitudinal extent thereof is plastically formed while converting kinetic energy to deformation work.

The forming element is preferably disposed on the functional element which is attached so as to be rotationally fixed in terms of the relative rotation of the spindle mechanism relative to the steering column, for example disposed on the spindle nut which is supported in a rotationally fixed manner on the actuator unit and in which the threaded spindle which is drivable in a rotating manner engages, on account of which a so-called rotary spindle drive is configured.

Alternatively, it is conceivable for the spindle nut in the case of a so-called immersion spindle drive to be supported in the longitudinal direction on the outer casing so as to be drivable in a rotating manner and for the threaded spindle which is immersed in the spindle nut and is attached so as to be rotationally fixed in relation to the steering column to be connected to the actuator unit by way of the energy absorbing installation. The threaded spindle in this assembly can have at least one forming element which in the event of a crash has the effect of forming the energy absorbing element which moves relative to said forming element.

It is advantageous for the forming element to be configured so as to be integrated in the spindle nut, preferably so as to be integral to the latter. A particularly compact construction can be implemented on account of the forming element which is integrated in the spindle nut. An integral integration which can take place by subtractive and/or non-subtractive forming of the spindle nut can be made in a space-saving and efficient manner, and high stability and functional reliability of the energy absorbing installation can be guaranteed.

In the case of an immersion spindle drive it is conceivable that the forming element is configured so as to be integrated in the threaded spindle, preferably so as to be integral to the latter.

The energy absorbing element can preferably be configured as an elongated flexural wire having a length, said flexural wire being movable relative to the forming element and being able to be formed by the forming element at least partially along the length of said flexural wire. A flexural wire can be designed as an elongate flexible strip having a round or angular cross-section. In the event of a crash, the flexural wire at least along part of the length thereof is moved relative to at least one forming element, wherein a plastic deformation is caused by the forming element, said plastic deformation being, for example, continuous bending moving along the longitudinal extent of the flexural wire, or a plastic deformation of the wire cross-section. The flexural wire can be produced and assembled in a simple and cost-effective manner and has energy absorbing properties which can be predefined and controlled in a defined manner.

The forming element can have at least one bending anvil about which the flexural wire is bent transversely to the longitudinal axis, preferably by 180°. The flexural wire or flexible strip is guided about at least one bending anvil in a bend which, when the flexural wire at least along part of the length thereof is pulled along the spindle nut or the threaded spindle in the event of a crash, while being continuously deformed by bending moves along at least part of the longitudinal extent of the flexural wire, wherein kinetic energy is continuously absorbed. For example, the flexural wire at a first end can be fixed to the actuator unit and by way of a first leg can extend counter to the longitudinal direction up to a bend which has a snug fit on a bending anvil and which can preferably be approximately 180°. A second leg which preferably extends counter to the alignment of the first leg, thus in the longitudinal direction, adjoins the bend. In the event of a crash, the second leg of the flexural wire is moved about the bending anvil, whereby said second leg runs through the bend and the first leg adjoining thereto extends in terms of length.

In terms of the assembling it is advantageous for the flexural wire to have a first end which is connected to the actuator unit, and for the to have a second, free, end. The first end of the flexural wire can have a fastening portion which is connected to the actuator unit and in the event of a crash is moved in the longitudinal direction relative to the forming element. The second end of the flexural wire is configured as a free end which is connected neither to the spindle nut, to the threaded spindle, nor the outer casing, but by way of the portion thereof that lies ahead of the operative engagement loosely protrudes from the forming element of the spindle nut. Simplified assembling results on account of only the first end of the flexural wire having to be secured to the actuator unit.

One advantageous embodiment provides that the spindle nut or the threaded spindle has at least one guiding element. The energy absorbing element is guided by the guiding element in the event of a crash such that the deformation takes place in a controlled manner and a defined energy absorbing characteristic is accordingly ensured. For example, a guiding element can be configured as a guiding groove in the form of a recess running in the longitudinal direction, in which an energy absorbing element embodied as a flexural wire or flexible strip is guided in the longitudinal direction in that said energy absorbing element in the event of a crash can slide along a bending anvil, for example. One or a plurality of guiding elements is/are preferably configured so as to be integral to the spindle nut, for example as molded groove-shaped recesses which serve as guiding grooves. The flexural wire or flexible strip in the direction of the longitudinal extent thereof is guided in a recess such that said flexural wire or flexible strip in a movement relative to the spindle nut or to the threaded spindle slides along so as to be guided in said recess in the event of a crash.

It can be provided in one advantageous embodiment that the flexural wire for forming a reserve coil, also referred to as a coil for short, is preferably helically wound so as to be coaxial with the spindle axis. The reserve coil preferably has a plurality of windings about the spindle axis. The reserve coil on a substantially cylindrical coil portion which on the spindle nut is configured so as to be coaxial with the spindle axis can preferably be helically wound about the spindle axis on the spindle nut.

The reserve coil can preferably be embodied as a single-tier flat coil which preferably has a plurality of windings which are successive in the axial direction. In the event of a crash, the flexural wire is preferably drawn off from the reserve coil in the axial direction and while performing respective forming work is moved along at least one forming element. For example, a flexural wire can be bent about one or a plurality of bending anvils until said flexural wire after the crash is stretched in the longitudinal direction between the fastening of said flexural wire on the casing tube and the spindle nut.

Long deformation paths can be implemented in particular in stowable steering columns which can be retracted into one another to a large extent. A relatively long flexural wire, which by way of a plurality of windings can be stored in the reserve coil, can be used on account of the reserve coil. When being unwound from the reserve coil in the event of a crash, the flexural strip which is being continuously bent can absorb kinetic energy uniformly over a long deformation path.

Long deformation paths are preferably understood to be paths of more than 80 mm.

It is advantageous for the reserve coil to be capable of being pulled apart and unwound substantially in the axial direction in terms of the spindle axis. On account thereof, the reserve coil in the event of a crash can be continuously unwound from the coiling portion. By being unwound in the axial direction, the flexural wire stored on the reserve coil can be unwound in a uniform manner and it is prevented that the windings tighten in the manner of loops on the coiling portion, on account which force required for unwinding could potentially be increased.

Figure 2:
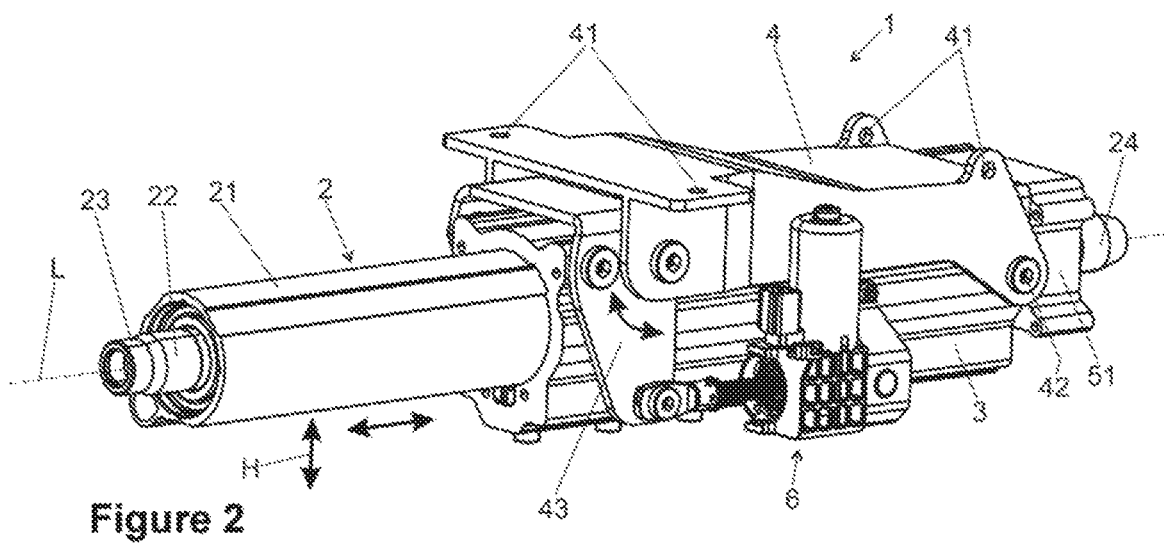
FIG. 2 is a further perspective view of the steering column according to FIG. 1.

FIGS. 1 and 2 show a steering column 1 according to the invention in its entirety in perspective views from the rear left and the rear right in terms of the travel direction of a motor vehicle not illustrated. The steering column 1 has an actuator unit 2 having a casing tube 21 in which a steering spindle 22 is coaxially mounted so as to be rotatable about a longitudinal axis L. The steering spindle 22 at the steering-wheel rear end thereof which in the installed state in the motor vehicle faces the driver has a fastening portion 23 for attaching a steering wheel not illustrated. The steering spindle 22, by way of the front end portion 24 which at the front protrudes from the steering column 1 at the steering gear, by way of an intermediate shaft not illustrated can be mechanically connected to a steering gear which is likewise not illustrated.

The actuator unit 2 is received in an outer casing 3 so as to be telescopic in the longitudinal direction, that is to say in the direction of the longitudinal axis L, wherein the casing tube 21 can be retracted forward into the outer casing 3 or be deployed rearward, as is indicated by a double arrow in FIG. 1.

The outer casing 3 is held in a support unit 4 which has fastening means 41 for connecting to a vehicle body not illustrated. A drive unit 51 of an adjustment drive 5 for the telescopic length adjustment of the actuator unit 2 relative to the outer casing 3 is fastened to the outer casing 3 in the front region at the steering gear, said length adjustment yet to be explained further below.

It can be derived from FIG. 2 that the outer casing 3 in the front region thereof is pivotable about a horizontal pivot axis 42, and in the rear region thereof by way of an actuator lever 43 is articulated on the support unit 4, said actuator lever 43 by a motorized height adjustment drive 6 being pivotable relative to the support unit 4 such that the rear end of the steering spindle 22 at the steering wheel for adjusting the steering wheel in terms of height is adjustable upward and downward in the height direction H relative to the support unit 4, as is indicated by the double arrow.

Figure 3:
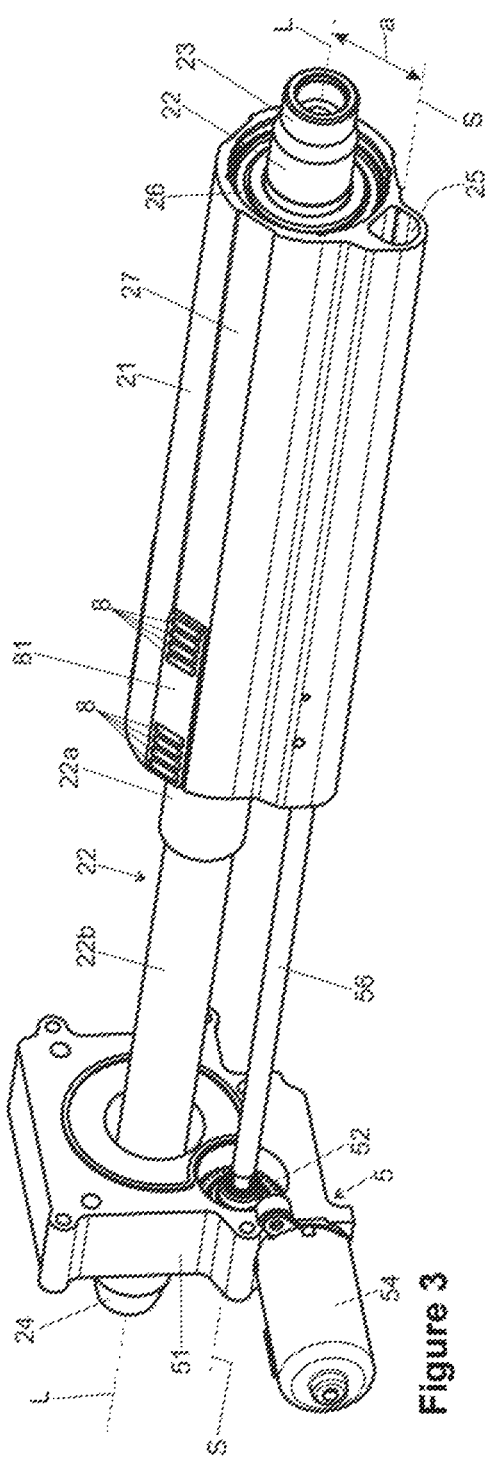
FIG. 3 is a schematic perspective partial view of the steering column according to FIG. 1.

FIG. 3 in the same perspective as in FIG. 1 shows an exploded stand-alone view, wherein the outer casing 3 has been omitted for improved clarity. A longitudinal section along the longitudinal axis L is illustrated in a lateral view in FIG. 4. The drive unit 51 of the adjustment drive 5 is fixedly connected to the front end of the outer casing 3 and has a worm gear 52 which in bearings 53 is rotatable about a spindle axis S and in the longitudinal direction is supported on the drive unit 51, as can be seen in the longitudinal section of FIG. 4. A worm 55 which is drivable in a rotating manner by an electric servomotor 54 meshes with the worm gear 52 such that the latter by the servomotor 54 is drivable so as to rotate about the spindle axis S.

A threaded spindle 56 which extends on said spindle axis S is connected in a rotationally fixed manner to the worm gear 52. The threaded spindle 56 is screwed into a spindle nut 57 in a threaded bore 57a which so as to be secured against rotation about the spindle axis S is attached to the casing tube 21 of the actuator unit 2 so as to be supported in the longitudinal direction, as will yet be explained in detail below. The threaded spindle 56 at the free end thereof has a detent member 560 which delimits the movement of the spindle nut 57 on the threaded spindle 56.

Figure 4:
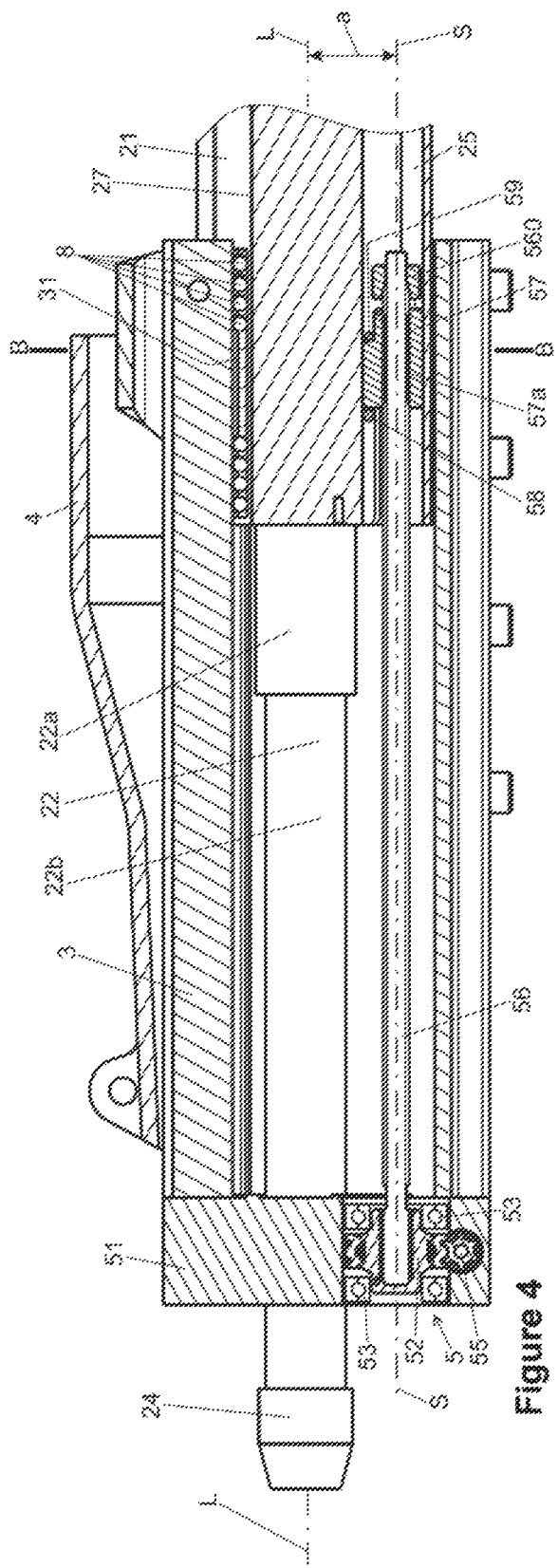
FIG. 4 is a partial longitudinal section through the steering column according to FIG. 1.

Depending on the driving direction by the servomotor 54, the threaded spindle 56 rotates, and is either screwed into the threaded bore 57a of the spindle nut 57, the latter on account thereof retracting the casing tube 21 and thus the actuator unit 2 in a forward telescopic manner toward the drive unit 51 into the outer casing 3, to the left in FIG. 4, or the threaded spindle 56 is screwed out of the spindle nut 57 so that the actuator unit 2 is deployed rearward out of the casing tube 3, to the right in FIG. 4.

The steering spindle 22 has an upper steering spindle part 22a and a lower steering spindle part 22b which are conjointly adjustable relative to one another in a rotationally fixed and telescopic manner in the longitudinal direction, so as to enable the longitudinal adjustment of the steering column 1.

Figure 5:
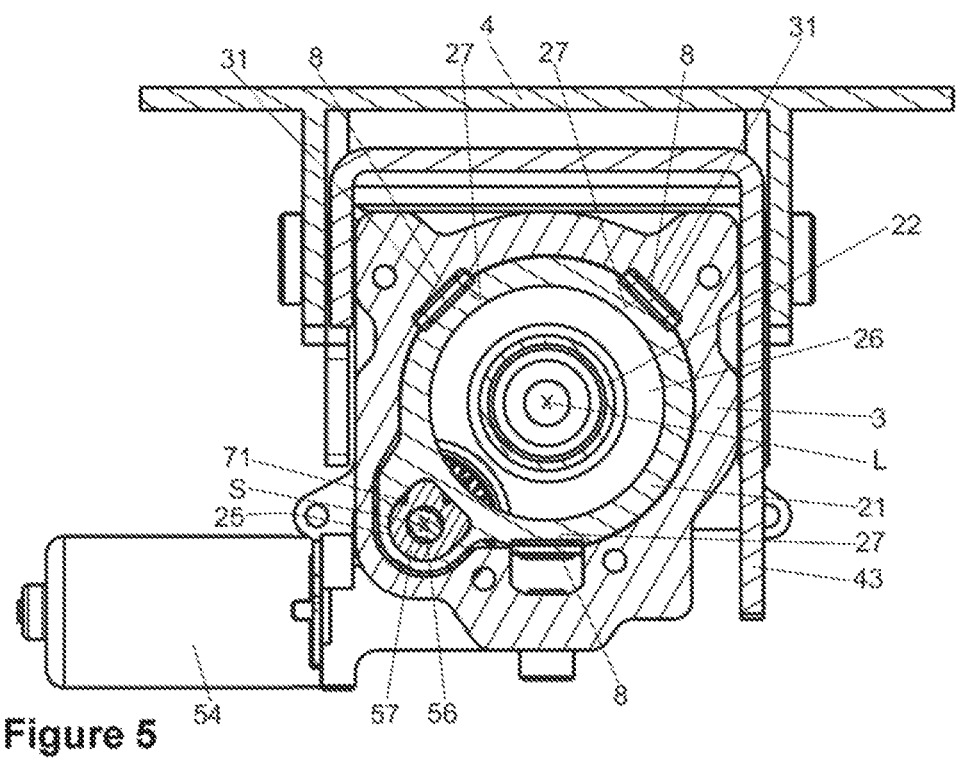
FIG. 5 is a cross-section through the steering column according to FIG. 1.

The spindle axis S in the example shown is disposed substantially parallel to the longitudinal L at a spacing a, that is to say that the threaded spindle 56 has a radial spacing a from the steering spindle 22 and is according to the invention at least in portions disposed within a spindle tunnel 25 within the actuator unit 2. The spindle tunnel 25 is formed by an opening which in the longitudinal direction runs through the casing tube 21 and which is configured so as to be separate from the opening 26 which likewise runs longitudinally and in which the steering spindle 22 is coaxially mounted on the longitudinal axis L, as can be derived from the cross section B-B from FIG. 5 illustrated in FIG. 6.

When the actuator unit 2 is retracted into the outer casing 3, the threaded spindle 56 is further immersed in the spindle tunnel 25. The threaded spindle 56 is accommodated so as to be protected in the spindle tunnel 25 in each setting state of the steering column 1.

Figure 6:
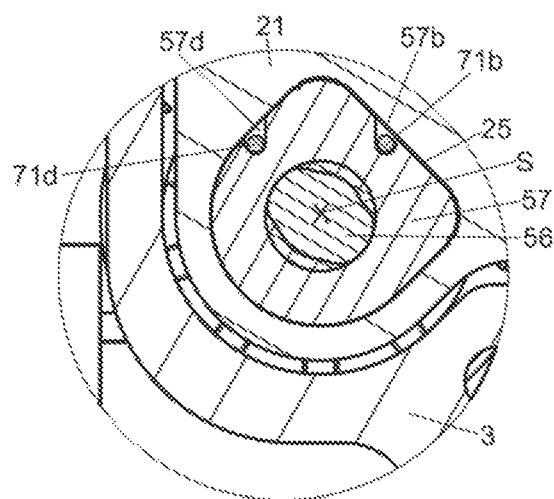
FIG. 6 is a detailed view from FIG. 5.

The enlarged fragment of the cross section in FIG. 6 shows that the spindle tunnel 25 has an eccentric cross-section in which the spindle nut 57 is inserted in a form-fitting manner such that said spindle nut 57 on account of the form-fit is secured against rotation relative to the casing tube 21 about the spindle axis S.

The spindle nut 57 in a forward manner in the longitudinal direction is secured by a fixing bolt 58 which transversely penetrates the spindle tunnel 25 and is fixedly inserted into the casing tube 21. In a rearward manner in the longitudinal direction, the spindle nut 57 is secured by means of a predetermined breaking element in the form of a shear pin 59 which likewise transversely penetrates the spindle tunnel 25. Consequently, the spindle nut 57 is established between the fixing bolt 58 and the shear pin 59.

Figure 9:
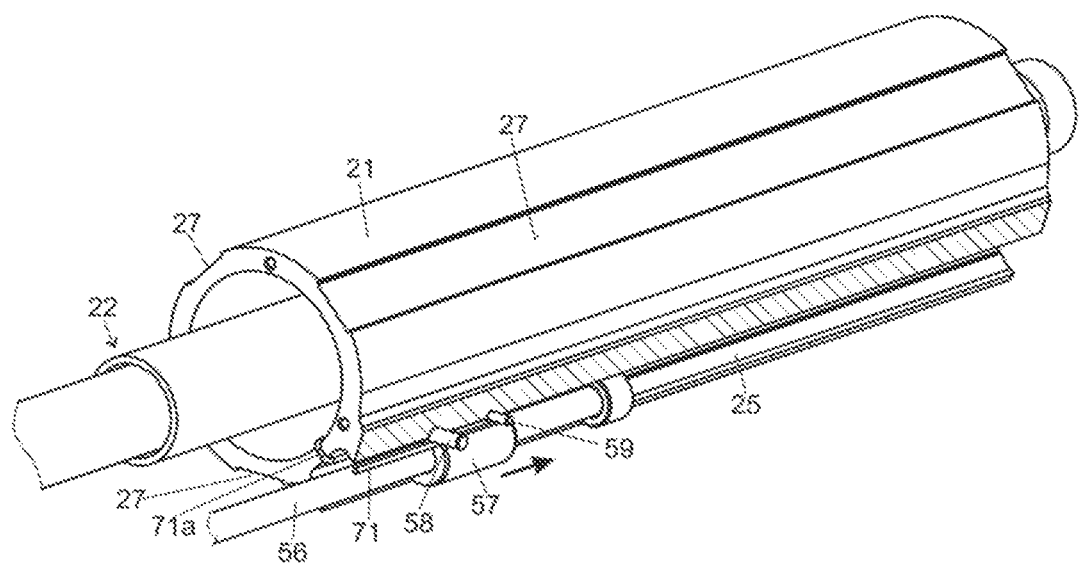
FIG. 9 is a further perspective view of the assembly according to FIG. 7.
Figure 10:
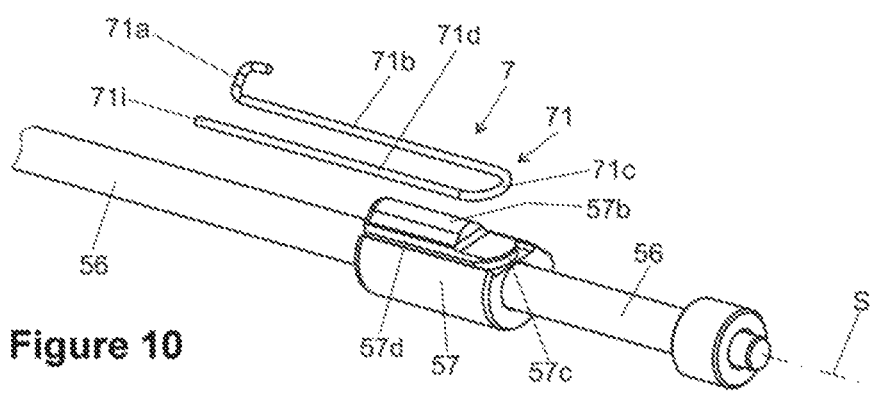
FIG. 10 is an exploded individual view of functional elements of the assembly according to FIG. 9.
Figure 11:
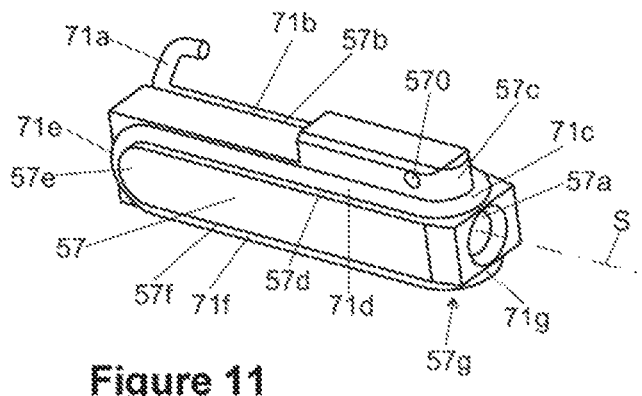
FIG. 11 is a schematic perspective view of a spindle nut with an energy absorbing element in a second embodiment in the non-deformed state prior to the event of a crash.
Figure 12:
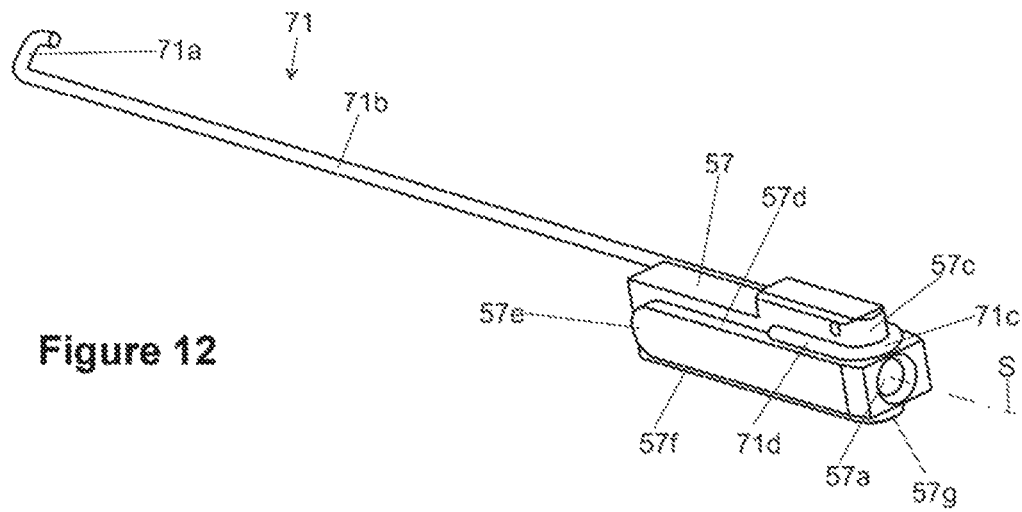
FIG. 12 is a view of the spindle nut according to FIG. 11 in the deformed state after the event of a crash.
Figure 13:
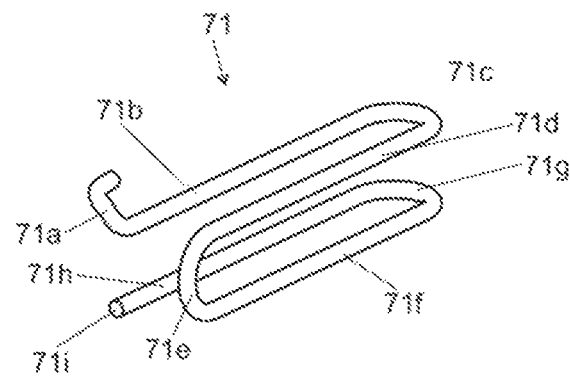
FIG. 13 is a stand-alone view of the energy absorbing element according to FIG. 11.

An energy absorbing installation 7 which has an energy absorbing element 71 in the form of a flexible wire 71 is disposed between the spindle nut 57 and the casing tube 21, said flexible wire 71 being shown in a first embodiment in FIGS. 6 to 10, and in a second embodiment in FIGS. 11 to 13.

It can be derived from the exploded illustration in FIG. 10 that the flexural wire 71 has a fastening portion 71a, the latter being joined by a first leg 71b which in the longitudinal direction runs rearward and which by way of a bend 71c of substantially 180° transitions to a second leg 71d which runs forward counter to the longitudinal direction. The fastening portion 71a is fastened at the front end of the casing tube 21, specifically hooked therein in a form-fitting manner, as can be seen in FIG. 9. The first leg 71b is disposed between a groove-shaped recess 57b of the spindle nut 57 that runs in the longitudinal direction and is routed rearward in the spindle tunnel 25, then guided about a bending anvil 57c configured on the spindle nut 57, and by way of the second leg 57c is guided to the front in a groove-shaped recess 57d between the spindle nut 57 and the spindle tunnel 25. The disposal of the legs 71a and 71b can be clearly seen in FIG. 6.

The groove-shaped recesses 57b and 57d and the bending anvil 57c form a guiding installation through which the flexural wire 71 is pulled in the event of a crash and on account of the plastic deformation taking place herein when being bent continuously absorbs kinetic energy.

Figure 7:
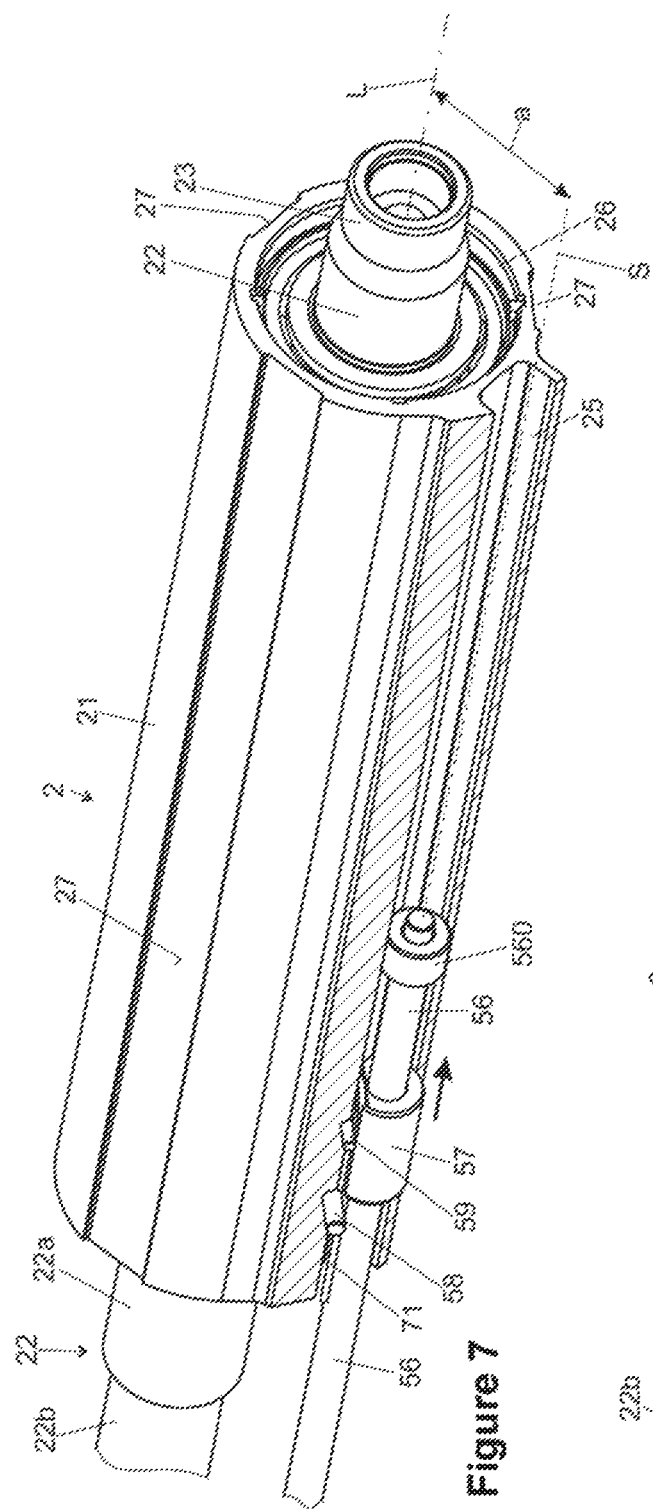
FIG. 7 is a schematic perspective view of a partially sectioned actuator unit of a steering column according to FIG. 1.

FIGS. 7 and 9 show perspective views, wherein the spindle tunnel 25 is sectioned in the longitudinal direction. The casing tube 21 in FIG. 8, in the same view as in FIG. 7, is omitted for improved clarity. It can be seen therefrom how the flexural wire 71 within the spindle tunnel 25 is guided about the spindle nut 57.

The energy absorbing installation 7 in the event of a crash is activated when a high force peak on account of an impacting body is exerted in a forward manner on the actuator unit 2 by way of the steering spindle 22. On account thereof, the spindle nut 57, which in a forward manner is supported on the threaded spindle 56, by said high force is pushed rearward in the longitudinal direction against the shear pin 59 which upon exceeding a predefined nominal limit value breaks and releases the rearward movement of the spindle nut 57 within the spindle tunnel 25 relative to the casing tube 21. The movement of the spindle nut 57 relative to the casing tube 21 in the event of a crash is indicated by an arrow in FIGS. 7 and 9.

In the relative movement between the spindle nut 57 and the casing tube 21 the casing tube 21 entrains the fastening portion 71a of the flexural wire 71 such that the first leg 71b, in the recess 57b, is drawn forward relative to the spindle nut 57, and the second leg 57d in relation to the spindle nut 57 is consequently moved rearward and hereby is forced about the bending anvil 57c such that the bend 71c is continuously moved along the flexural wire 71, wherein kinetic energy for the absorption of energy is continuously converted to deformation work and, by virtue of the friction acting between the flexural wire 71 and the spindle nut 57, to a minor part is also converted into heat such that a controlled deceleration of the actuator unit 2 relative to the outer casing 3 is effected. The flexural wire 71 has an end portion 71i, which can also be referred to as the free end, wherein the end portion 71i is not established and in the event of a crash thus moves relative to the spindle nut 57. The fastening portion 71a thus moves conjointly with the actuator unit 2, wherein the end portion 71i moves relative to the actuator unit 2 as well as relative to the spindle nut 57.

According to the invention the threaded spindle 56 as well as the energy absorbing installation 7 is protected by the flexural wire 71 and thus accommodated in a functionally reliable manner within the actuator unit 2, in the example shown within the spindle tunnel 25.

A second embodiment of an energy absorbing installation having a flexural wire 71 is illustrated in FIGS. 11 to 13. Said flexural wire 71 in addition to the first embodiment described above has a second bend 71e of approximately 180° which adjoins the second leg 71b and which is adjoined by a third leg 71f which by way of the third bend 71g of substantially 180° transitions to a fourth leg 71h. The leg 71b and 71f are oriented in, the legs 71d and 71h are oriented counter to the longitudinal direction.

The spindle nut 57 has a guiding installation comprising recesses 57b, d, f, h which correspond to the profile of the flexural wire 71, and a second bending anvil 57e about which the bend 71e is guided, and a third bending anvil 57g about which the bend 71g is guided. The flexural wire 71 prior to the event of a crash is disposed in the guiding installation of the spindle nut 57 as shown in FIG. 11. In the event of a crash, the flexural wire 71 is pulled through the recess 57b, 57d, 57f, 57h about the total of three bending anvils 57c, 57g, and 57e, while performing in each case forming work, until said flexural wire 71 after the event of the crash is stretched in the longitudinal direction as is illustrated in FIG. 12. On account thereof, a relatively long flexural wire 71 which in the guiding installation is wound multiple times about the spindle nut 57 and in the event of a crash can absorb kinetic energy uniformly along a long deformation path can be used. The spindle nut 57 of the second embodiment has a bore 570 which is disposed so as to be orthogonal to the spindle axis S. The shear pin 59 which is coupled to the actuator unit can be inserted into said bore. A particularly compact and protected construction mode is possible on account of the spindle nut 57 being disposed within the actuator unit 2, in particular in the spindle tunnel 25. The flexural wire 71 has an end portion 71$i$ which can also be referred to as the free end, wherein the end portion 71$i$ is not established and in the event of a crash thus moves relative to the spindle nut 57. The fastening portion 71$a$ in the event of a crash thus moves conjointly with the actuator unit 2, wherein the end portion 71$i$ moves relative to the actuator unit 2 as well as relative to the spindle nut 57.

The casing tube 21 can be configured as an extruded profile, for example from an aluminum or magnesium alloy.

In order for a smooth-running linear bearing of the actuator unit 2 to be implemented in the outer casing 3, roller element raceways 27 can be configured externally on the casing tube 21, three roller element raceways 27 which extend along the entire length and may be molded so as to be integral to the casing tube 21 being distributed across the circumference in the example shown. Corresponding roller element raceways 31 are configured internally in the outer casing 3 so as to be radially opposite said roller element raceways 27. Rollers 8 which for forming a smooth-running linear bearing are able to roll in the longitudinal direction when adjusting the steering column 1 are disposed as roller elements so as to be rotatable in a roller cage 81 between the roller elements raceways 27 and 31.

Figure 14:
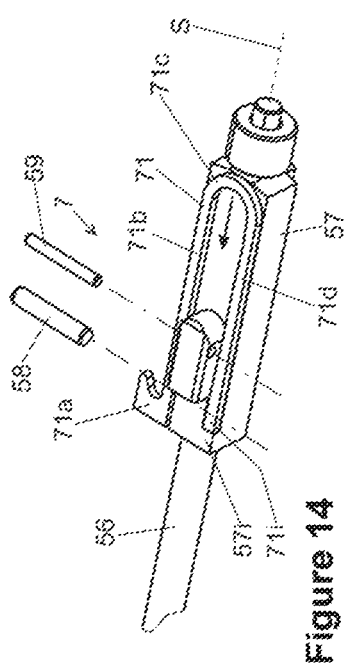
FIG. 14 is a schematic perspective view of a spindle nut with an energy absorption element in a third embodiment in the non-deformed state prior to the event of a crash.
Figure 15:
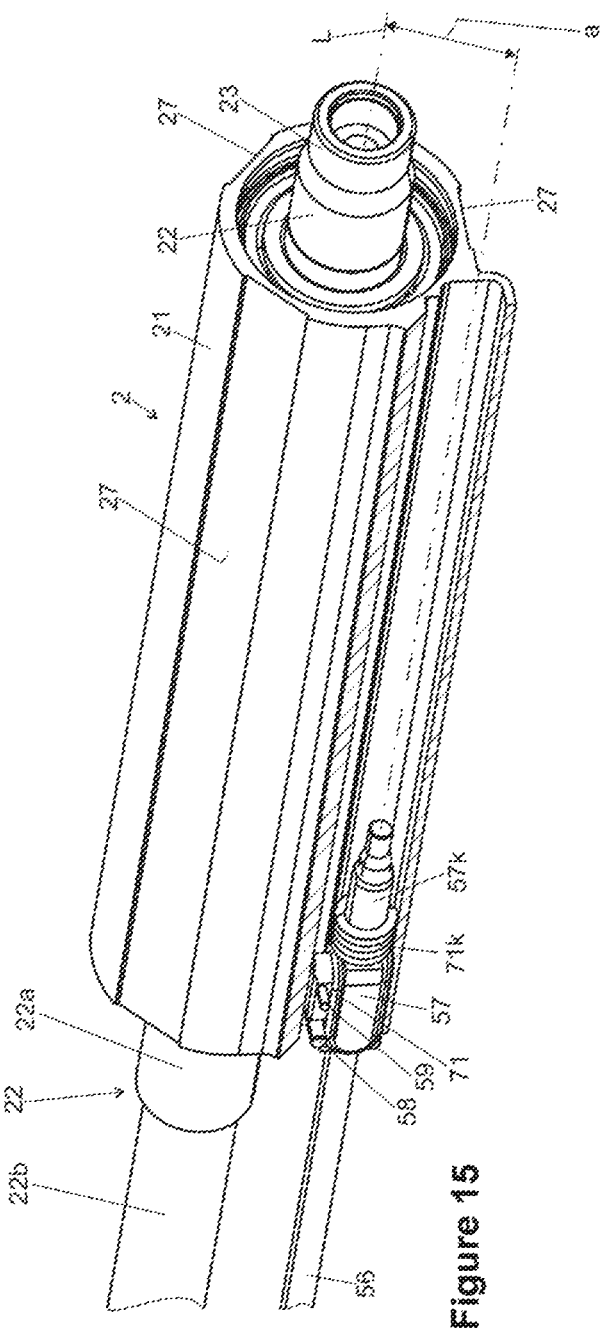
FIG. 15 is a schematic perspective view of a partially sectioned actuator unit of a steering column, in a manner analogous to that of FIG. 7, with an energy absorbing element in a fourth embodiment.

A spindle nut 57 having an energy absorbing installation is shown in a third embodiment in a view similar to that in FIG. 11 in FIG. 14. Said spindle nut 57 has a flexural wire 71 having a first leg 71$b$ and a second leg 71$d$. The first leg 71$b$ which in the longitudinal direction runs rearward at the front free end thereof has a hook-shaped fastening portion 71$a$, and by way of a bend 71$c$ of substantially 180° transitions to the second leg 71$d$ which counter to the longitudinal direction runs forward. The bend 71$c$ in this embodiment is freely bent, that is to say that said bend 71$c$ is not guided so as to lie on a bending anvil 57$c$ as in FIG. 11. The second leg 71$d$ by way of the front, free, end 71$i$ is supported in a forward manner on a counter bearing 57$i$ on the spindle nut 57. The flexural wire 71 has a rectangular cross section.

The flexural wire 71 by way of the fastening portion 71$a$ is hooked into the casing tube 21, as is described in the context of the embodiment in FIGS. 10 to 12. In the event of a crash the flexural wire 71 is continuously bent, wherein the in this embodiment free bend 71$c$ in the longitudinal direction travels relative to the spindle nut 57, as is indicated by the arrow in FIG. 14. A fourth embodiment of an energy absorbing installation 7 is shown in FIGS. 15 to 18, wherein the view of FIG. 15 corresponds to the view of FIG. 7, FIG. 16 corresponds to the view of FIG. 11 or 14, FIG. 17 corresponds to the view of FIG. 13, and FIG. 18 shows the situation after the event of a crash in a manner analogous to FIG. 12. The same reference signs are in each case used for equivalent components.

The spindle nut 57, in a manner similar to the embodiment shown in FIG. 12, has the groove-shaped recesses 57$b$, 57$d$, and 57$f$, the bending anvils 57$c$ and 57$e$ being disposed in the profile of said recesses 57$b$, 57$d$, and 57$f$. A guiding installation through which the flexural wire 71 is pulled in the event of a crash and by way of which the plastic deformation arising in the bending herein continuously absorbs kinetic energy is formed on account thereof.

Figure 17:
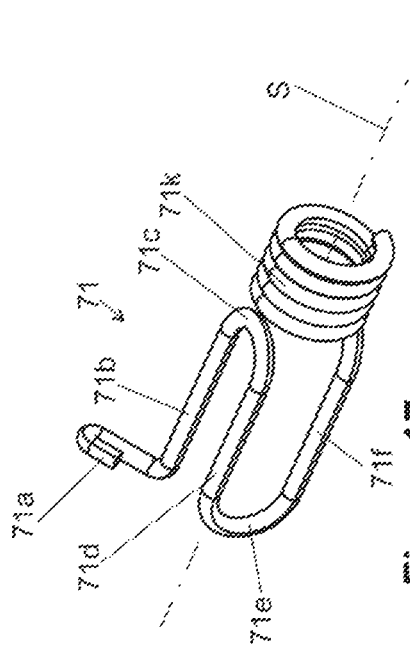
FIG. 17 is a stand-alone view of the energy absorbing element according to FIG. 16.
Figure 16:
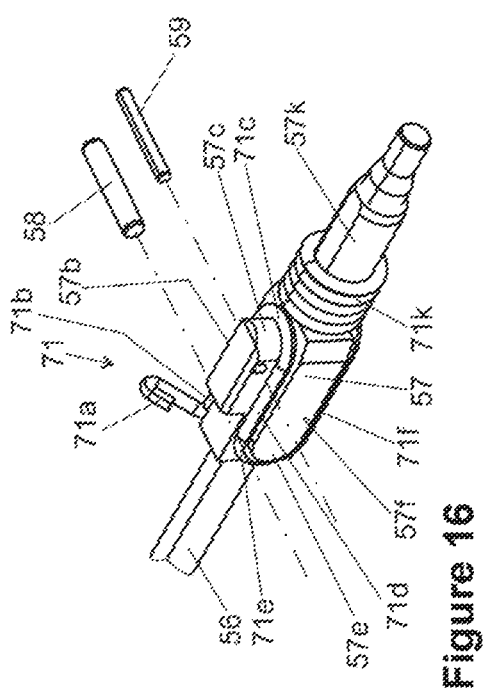
FIG. 16 is a schematic perspective view of a spindle nut with an energy absorbing element in the fourth embodiment in a non-deformed state prior to the event of a crash.
Figure 18:
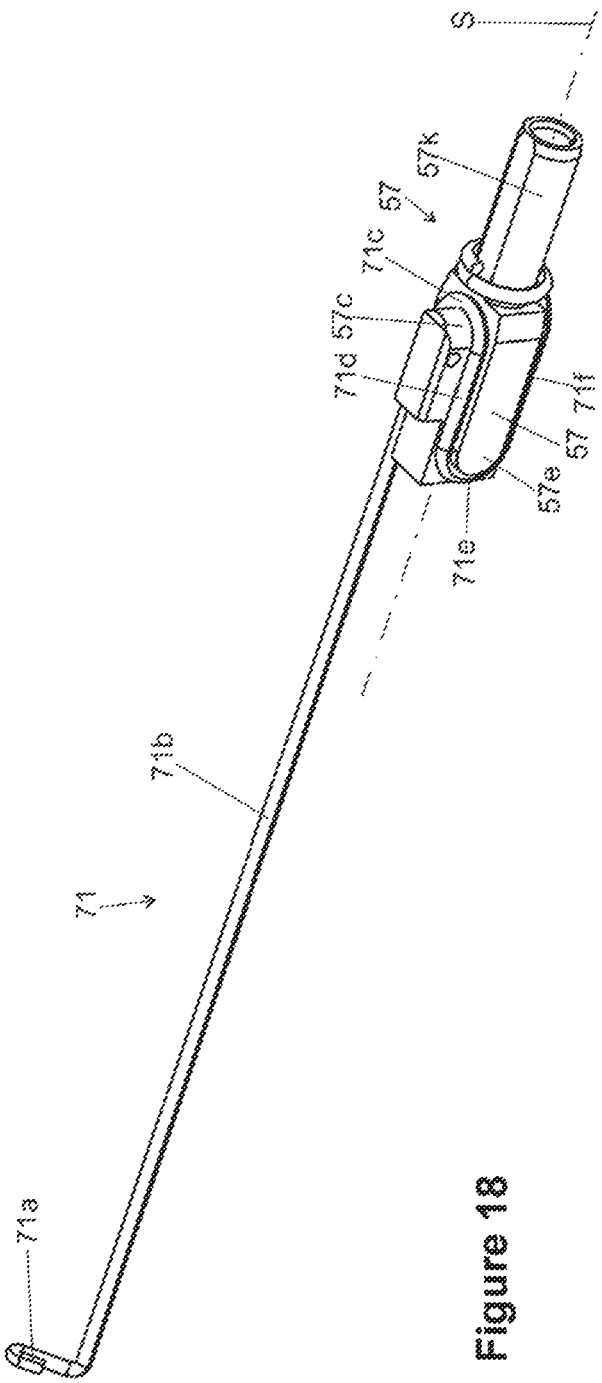
FIG. 18 is the spindle nut according to FIG. 16 with an energy absorbing element in the deformed state after the event of a crash.

As can be clearly seen in FIG. 17, the flexural wire 71 has a hook-shaped fastening portion 71$a$ which is adjoined by a first leg 71$b$ which in the longitudinal direction runs rearward and by way of a bend 71$c$ of substantially 180° transitions to a second leg 71$d$ which counter to the longitudinal direction runs forward. The fastening portion 71$a$ is fastened to the front end of the casing tube 21, specifically hooked thereinto in a form-fitting manner, as in FIG. 9. The first leg 71$b$ is disposed in the groove-shaped recess 57$b$ of the spindle nut 57 that runs in the longitudinal direction, and in the spindle tunnel 25 is routed rearward, then in the region of the bend 71$c$ of said first leg 71$b$ is guided about the bending anvil 57$c$. The second leg 57$c$ which adjoins the bend 71$c$ is disposed in the groove-shaped recess 57$d$, and by way of the bend 71$e$ is guided about the second bending anvil 57$e$, and transitions to the third leg 71$f$. Subsequently, the flexural wire 71 for forming a reserve coil 71$k$, also referred to as the coil for short, is helically wound about the spindle axis S on a substantially cylindrical coiling portion 57$k$ which is configured on the spindle nut 57 so as to be directed rearward and coaxial with the spindle axis S.

As can be seen in FIG. 17, the reserve coil 71$k$ is embodied as a single-tier, flat, coil which preferably has a plurality of windings which are successive in the axial direction. In the event of a crash the flexural wire 71 is drawn from the reserve coil 71$k$ in the axial direction into the recess 57 and is pulled through the recesses 57$f$, 57$d$, and 57$b$, and about the intervening two bending anvils 57$e$ and 57$c$ while in each case performing deforming work, until said flexural wire 71 after the crash is stretched in the longitudinal direction between the fastening portion 71$a$ and the spindle nut 57, as is illustrated in FIG. 18.

A relatively long flexural wire 71 which in a plurality of windings can be stored in the reserve coil 71$k$ can be used. When being unwound from the reserve coil in the event of a crash, the flexural strip 71 which is continuously being bent about the bending anvils 57$e$ and 57$c$ can absorb kinetic energy uniformly along a long deformation path.

It is a particular advantage of this assembly that the reserve coil 71$k$ by way of the leg 71$f$ is pulled apart and unwound substantially in the axial direction in terms of the spindle axis S. On account thereof, the reserve coil 71$k$ in the event of a crash can be continuously unwound from the coiling portion 57$k$ until the state shown in FIG. 18 is achieved, the latter being achieved in a manner analogous to FIG. 12. On account of the unwinding in the axial direction, the flexural wire stored on the reserve coil 71$k$ can be unwound in a uniform manner and it is prevented that the windings tighten in the manner of loops on the coiling portion 57, on account which force required for unwinding could potentially be increased.

One advantage of the embodiment described in FIGS. 15 to 18 lies in that the bending anvils 57$e$ and 57$c$ are engaged with the flexural wire 71 for deformation along the entire deformation path, the latter corresponding to the length of the flexural wire 71 stored in the reserve coil 71$k$. On account thereof, the deformation output in the event of a crash is substantially constant and uniform deceleration takes place.

LIST OF REFERENCE SIGNS

1 Steering column
2 Actuator unit

21 Casing tube
22 Steering spindle
22a,b Steering spindle part
23 Fastening portion
24 End portion
25 Spindle tunnel
26 Opening
27 Roller element raceways
3 Outer casing
31 Roller element raceways
4 Support unit
41 Fastening means
42 Pivot axis
43 Actuator lever
5 Adjustment drive
51 Drive unit
52 Worm gear
53 Bearing
54 Servomotor
55 Worm
56 Threaded spindle
57 Spindle nut
57a Threaded bore
57b,d,f,h Recess (guiding groove)
57c,e,g Bending anvil
57i Counter bearing
57k Coiling portion
58 Fixing bolt
59 Shear pin
6 Height adjustment drive
7 Energy absorbing installation
71 Flexural wire
71a Fastening portion
71b,d,f,h Leg
71c,e,g Bend
71i End portion
71 Reserve coil
8 Roller
81 Roller cage
L Longitudinal axis
S Spindle axis

What is claimed is:

1. A motor-adjustable steering column for a motor vehicle, comprising:
    a support unit that is configured to attach to a vehicle body;
    an outer casing which is held by the support unit;
    an actuator unit comprising a casing tube, the actuator unit received within the outer casing and configured to telescopically adjust in a longitudinal direction;
    a steering spindle coaxially mounted in the casing tube and configured to rotate about a longitudinal axis; and
    an adjustment drive disposed operatively between the outer casing and the actuator unit, the adjustment drive comprising a threaded spindle which is at least in part disposed within the actuator unit and is configured to be driven in a rotating manner by an electric servomotor engaged in a spindle nut, the threaded spindle being spaced apart from the longitudinal axis.

2. The steering column of claim 1 wherein the threaded spindle is supported in the longitudinal direction on the outer casing, and the spindle nut is attached in a rotationally fixed manner on the actuator unit so as to be supported in the longitudinal direction.

3. The steering column of claim 1 wherein the threaded spindle is disposed parallel to the longitudinal axis.

4. The steering column of claim 1 wherein the actuator unit has an opening that receives the steering spindle, and the threaded spindle is disposed in a spindle tunnel that is configured so as to be separate from the opening.

5. The steering column of claim 4 wherein the opening and the spindle tunnel are both circumferentially closed.

6. The steering column of claim 4 wherein the opening and the spindle tunnel are configured in the casing tube of the actuator unit.

7. The steering column of claim 6 wherein the casing tube is configured as an extruded profile.

8. The steering column of claim 4 wherein the spindle nut is fastened in the spindle tunnel.

9. The steering column of claim 1 wherein the outer casing comprises an extruded profile.

10. The steering column of claim 1 wherein at least one sliding or roller-bearing mounted linear guide is disposed between the outer casing and the actuator unit.

11. The steering column of claim 1 wherein an energy absorbing installation is disposed between the outer casing and the actuator unit.

12. The steering column as of claim 11 wherein the energy absorbing installation has an energy absorbing element which is disposed directly or indirectly between the spindle nut or the threaded spindle and the actuator unit.

13. The steering column of claim 1 wherein a predetermined breaking element is disposed between the spindle nut or the threaded spindle and the actuator unit.

14. The steering column of claim 1 wherein the steering spindle is coupled to a steering gear or a feedback actuator.

* * * * *